United States Patent [19]

McDaniel

[11] 4,398,738
[45] Aug. 16, 1983

[54] SELF-STEERING AND RETRACTABLE AXLE ASSEMBLY

[76] Inventor: Thomas I. McDaniel, Rte. 1, Box 289C, Aztec, N. Mex. 87410

[21] Appl. No.: 247,741

[22] Filed: Mar. 26, 1981

[51] Int. Cl.³ ........................ B62D 53/08; B62D 21/00
[52] U.S. Cl. .................................. 280/81 R; 280/80 B
[58] Field of Search .................. 280/81 A, 81 R, 426, 280/80 B, 29

[56] References Cited

U.S. PATENT DOCUMENTS

| | | | |
|---|---|---|---|
| 2,748,879 | 6/1956 | Bailey | 280/81 R |
| 3,063,732 | 11/1962 | Harbers et al. | 280/81 R |
| 3,395,929 | 8/1968 | Hoye | 280/81 R |
| 3,502,345 | 3/1970 | Hulverson | 280/81 R |
| 3,860,257 | 1/1975 | Mesly | 280/81 A |
| 3,912,293 | 10/1975 | Harbers | 280/81 R |
| 4,162,082 | 7/1979 | Curry | 280/81 A |
| 4,365,820 | 12/1982 | Rush | 280/80 B |

*Primary Examiner*—Richard A. Bertsch
*Attorney, Agent, or Firm*—Harvey B. Jacibson

[57] ABSTRACT

A semi-trailer construction including forward coupling structure for universal coupling and support from a towing vehicle, a rear portion from which wheeled running gear is supported and an intermediate portion dependingly supporting supplemental wheeled running gear is provided. The supplemental wheeled running gear includes a mounting plate supported beneath the semi-trailer frame for oscillation relative thereto about a vertical axis and horizontal shifting relative to the frame along a predetermined path extending through the axis of oscillation of the mounting plate relative to the frame. The mounting plate supports a transverse axle assembly therefrom having support wheels journaled thereon and the axle assembly is disposed generally normal to the aforementioned path. The mounting plate may be shifted along the path between first and second limit positions with a vertical plane containing the axis of rotation of the support wheels and disposed normal to the aforementioned path disposed on opposite sides of the axis of oscillation of the mounting plate relative to the trailer frame. Further, the axle assembly is supported from the mounting plate for guided vertical movement relative thereto and is yieldingly biased downwardly relative to the mounting plate and may be selectively upwardly retracted relative to the mounting plate.

9 Claims, 11 Drawing Figures

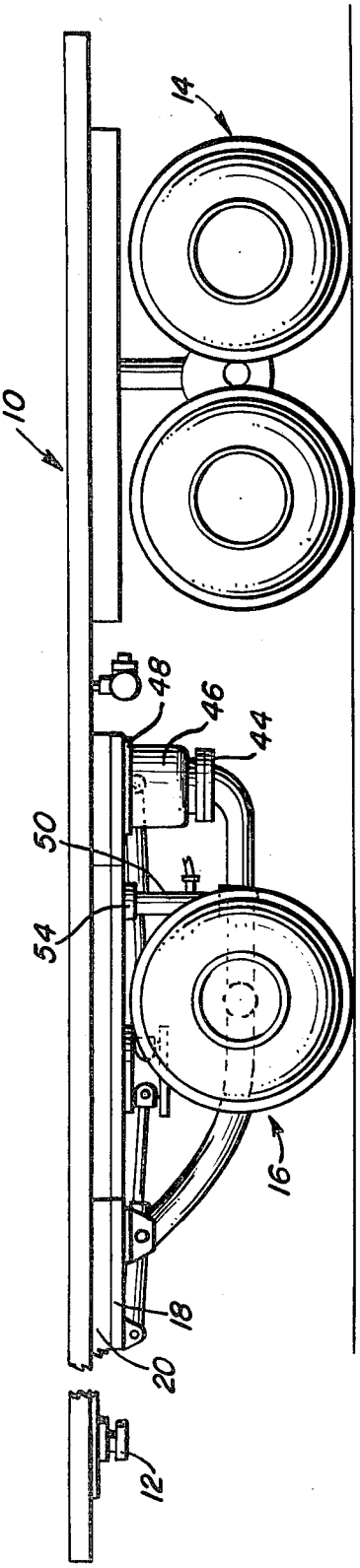
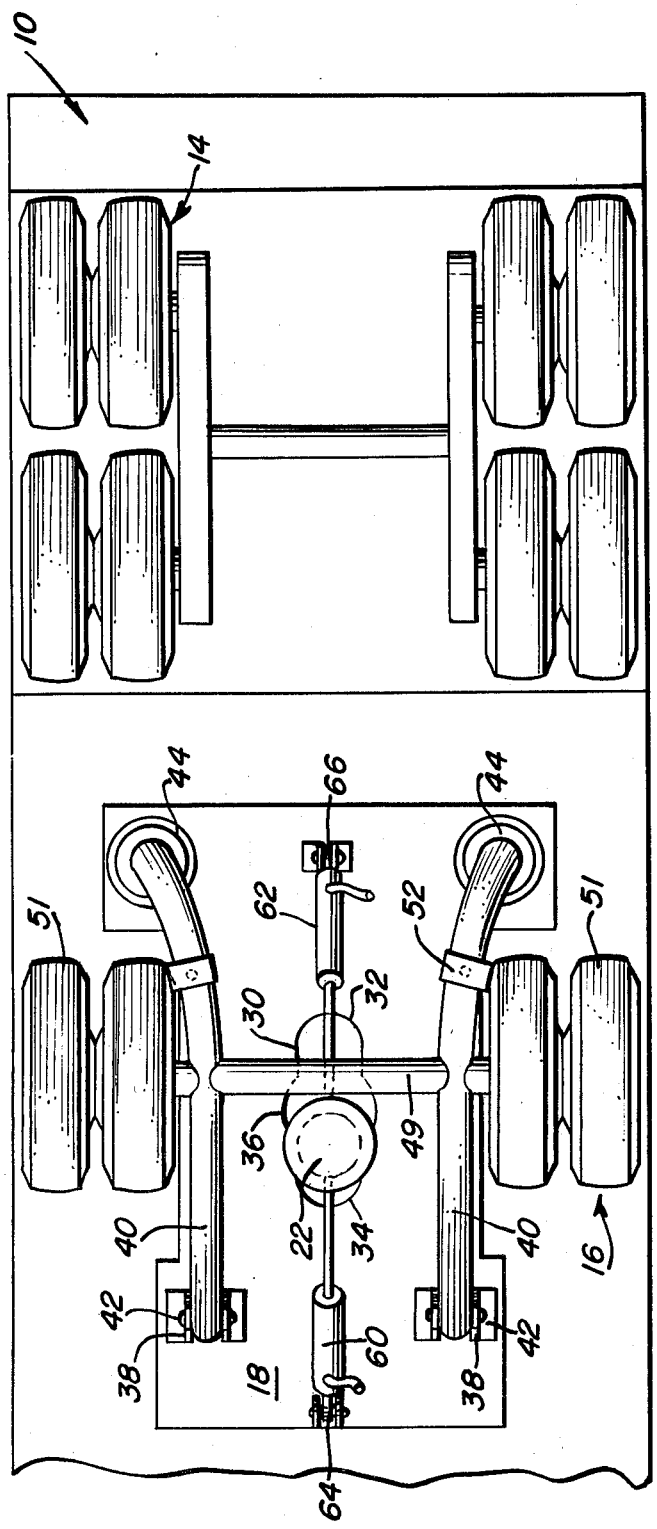

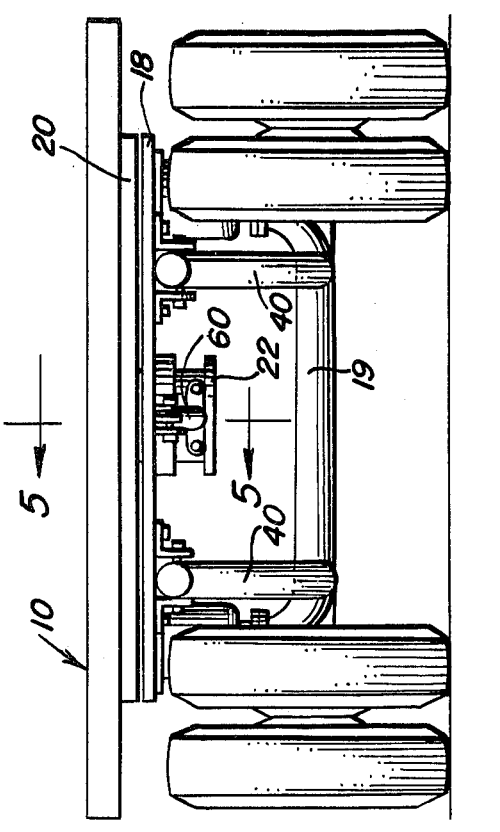
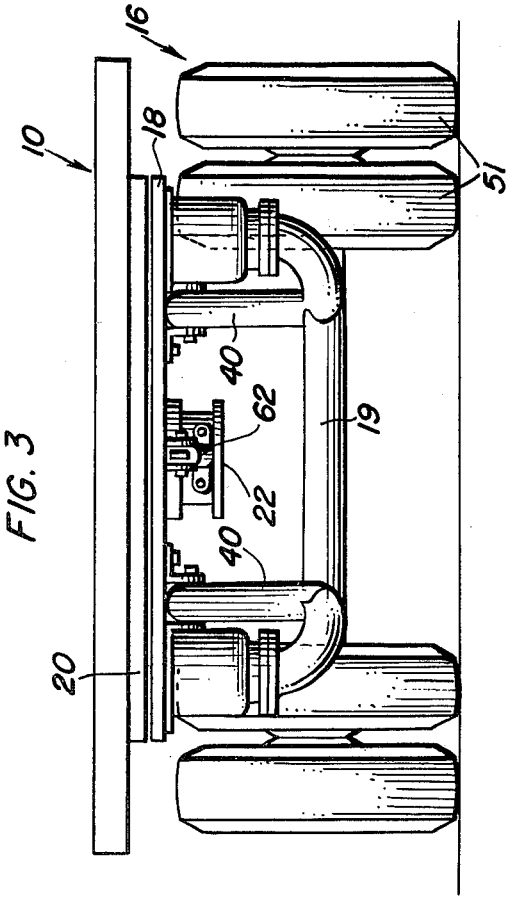
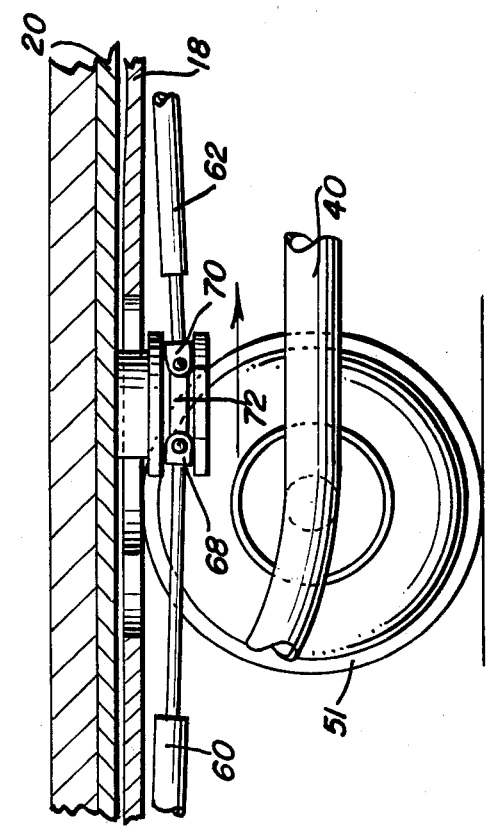
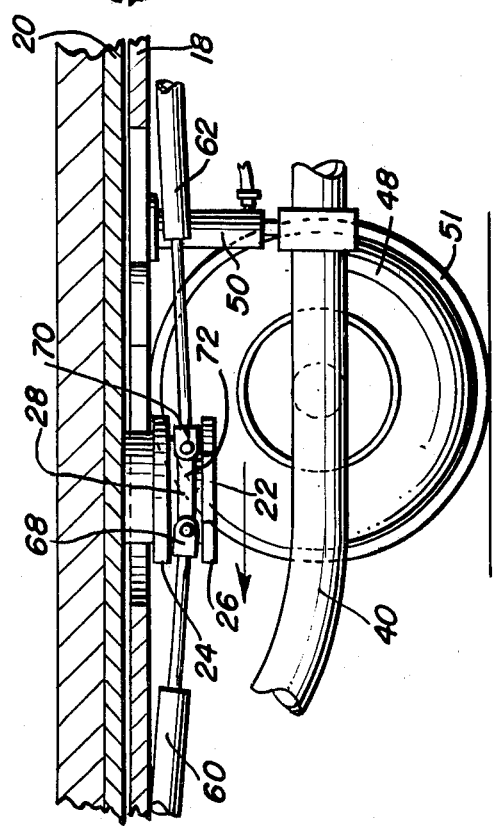

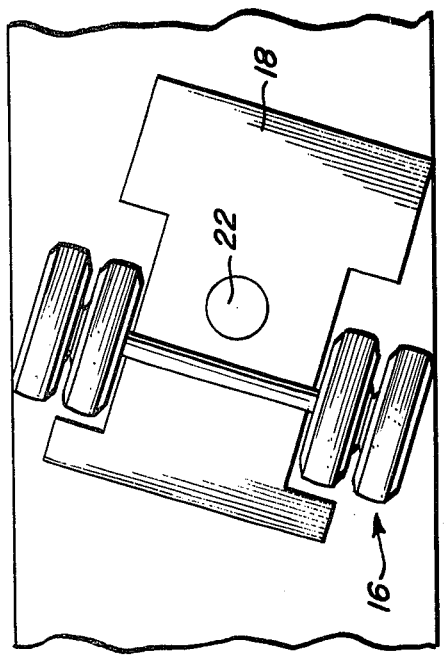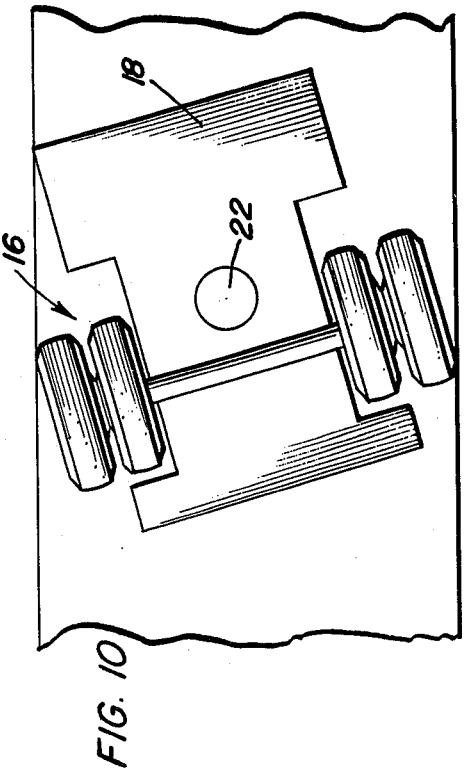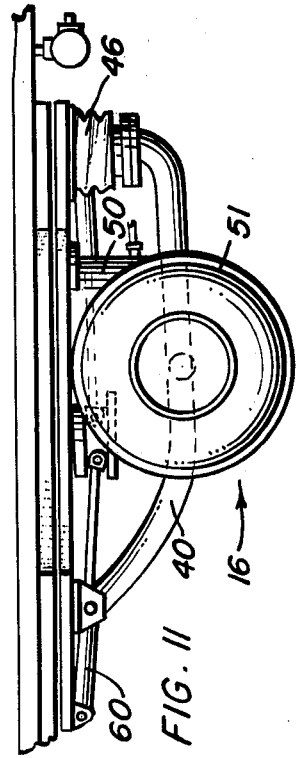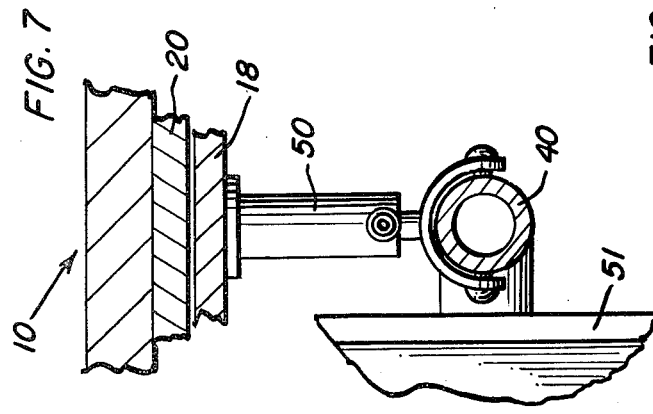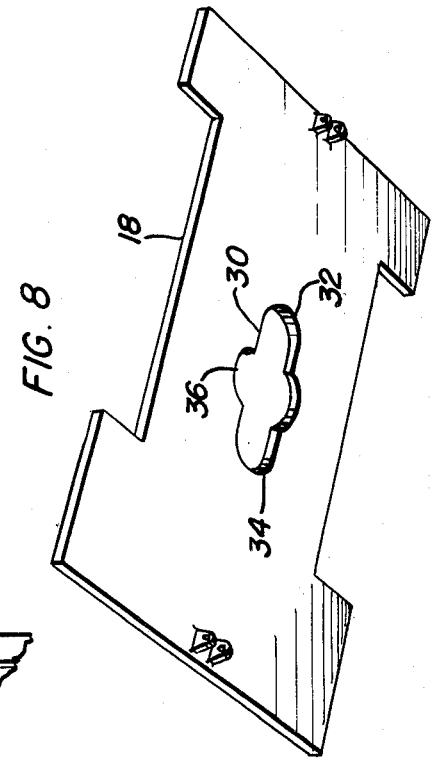

SELF-STEERING AND RETRACTABLE AXLE ASSEMBLY

BACKGROUND OF THE INVENTION

Various forms of semi-trailers designed to carry heavy loads are provided with central lift wheel assemblies, such as that disclosed in U.S. Pat. No. 3,093,388 wherein the lift wheel assembly may be used, during over-the-road operations, for supporting a portion of the load and with the lift wheel assembly being upwardly retractable when the trailer is moving at slow speeds and executing sharp turns. However, this type of lift wheel assembly can experience excessive lateral forces and sliding tire wear if the lift wheel assembly is not lifted during sharp turns and backing operations. Further, although various forms of trucks and other wheeled load supporting structures include caster wheel assemblies which are freely pivotable about upstanding axes such as those disclosed in U.S. Pat. Nos. 3,246,908 and 1,672,035, the utilization of full caster wheel assemblies on high speed vehicles has not been carried out due to the tendency of such caster wheel assemblies to shimmy at high speeds.

BRIEF DESCRIPTION OF THE INVENTION

A trailing arm supported axle assembly including an upper mounting plate is provided for mounting beneath a semi-trailer frame centrally intermediate the front and rear ends of the trailer frame with the mounting plate enjoying a pin and slot connection with the trailer frame enabling pivotable movement of the mounting plate about an upstanding axis and shifting of the mounting plate along a predetermined path through which the axis of oscillation of the mounting plate extends and with the mounting plate shiftable between a first limit position with an upstanding plane containing the axis of rotation of the wheels disposed on one side of the pivot axis of the mounting plate and a second position with the aforementioned upstanding plane disposed on the other side of the pivot axis of the mounting plate. In this manner, the trailing arm supported axle assembly may function in the manner of a caster wheel assembly whether the trailer is moving forward or in reverse independent of pivotal movement of the mounting plate through an arc of more than 90°.

The main object of this invention is to provide a supplemental lift wheel assembly of the automatic steering type for mounting beneath a trailer frame between the forward point of universal coupling of the trailer frame to a towing vehicle and rear support wheels of the trailer frame.

Another object of this invention is to provide a lift wheel assembly in accordance with the preceding object and which may be selectively retracted upwardly from the ground when desired.

Still another important object of this invention is to provide a lift wheel assembly constructed in a manner whereby it may be readily operatively associated with substantially all forms of over-the-road semi-trailer frames (exclusive of the various drop center types).

Yet another object of this invention is to provide a lift wheel assembly of lightweight construction and which may effectively utilize lightweight air bag suspension means.

A final object of this invention to be specifically enumerated herein is to provide a lift wheel assembly in accordance with the preceding objects and which will conform to conventional forms of manufacture, be of simple construction and easy to use, so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary side elevational view of a typical form of semi-trailer with the self-steering and upwardly retractable axle of the instant invention operatively associated therewith;

FIG. 2 is a fragmentary bottom plan view of the assemblage illustrated in FIG. 1;

FIG. 3 is a rear elevational view of the assemblage illustrated in FIG. 1;

FIG. 4 is a front elevational view of the assemblage illustrated in FIG. 1 with the fifth wheel pin structure removed;

FIG. 5 is a longitudinal vertical sectional view taken substantially upon the plane indicated by the section line 5—5 of FIG. 4 and with the axle assembly in a partially rearwardly shifted position;

FIG. 6 is a fragmentary longitudinal vertical sectional view similar to FIG. 5 and with the axle assembly in a partially forwardly shifted position;

FIG. 7 is an enlarged vertical sectional view taken substantially upon the section line 7—7 of FIG. 5;

FIG. 8 is a perspective view of the mounting plate for the axle assembly;

FIGS. 9 and 10 are fragmentary bottom plan views illustrating the sharp turning capacity of the trailer; and FIG. 11 is a fragmentary side elevational view of the trailer with the axle assembly upwardly retracted.

DETAILED DESCRIPTION OF THE INVENTION

Referring now more specifically to the drawings, the numeral 10 generally designates a conventional form of semi-trailer including a forward depending king pin 12 of conventional construction and a rear running gear assembly referred to in general by the reference numeral 14.

The trailer 10 further includes an intermediate supplemental wheel assembly referred to in general by the reference numeral 16 including a bearing plate 20 secured to the underside of the trailer 10 and a mounting plate 18 underlying the bearing plate 20. The bearing plate 20 includes a depending pivot pin 22 including upper and lower diametrically enlarged axially spaced circumferential flanges 24 and 26 and that portion 28 of the pin 22 disposed above the flange 24 is slidably and rotatably received in a slot 30 formed in the mounting plate 18. The slot 30 includes rounded opposite end portions 32 and 34 and a laterally enlarged midportion 36 through which the flanges 24 and 26 may be upwardly retracted. When the mounting plate is disposed beneath the bearing plate in sliding and oscillatory engagement therewith, the upper flange 24 opposes the underside of the mounting plate 18 on opposite sides of the slot 30, when the pin 22 is not centered between the opposite ends 32 and 34 of the slot 30, and retains the mounting plate 18 supported from the base plate 20 for oscillation relative thereto and also guided sliding movement of the plate 18 relative to the plate 20 longitudinally of the slot 30.

The forward portion of the mounting plate 18 includes a pair of opposite side hanger assemblies 38 from which the forward ends of a pair of trailing arms 40 are pivotally supported as at 42. The rear ends of the trailing arms 40 support bag mounting plates 44 from which the lower ends of a pair of air bags 46 are supported, the upper ends of the air bags 46 being anchored relative to the rear portion of the mounting plate 18 as at 48.

The longitudinal midportions of the trailing arms 40 have the opposite end portions of a transverse axle 49 supported therefrom and the opposite ends of the axle 49 rotatably journal dual wheels 51 therefrom. In addition, air actuated lift cylinders 50 have their lower ends anchored relative to the trailing arms 40 as at 52 and their upper ends anchored relative to the mounting plate 18 as at 54 whereby the rear ends of the trailing arms 40 may be upwardly retracted relative to the mounting plate 18.

A pair of fluid cylinders 60 and 62 have front and rear ends thereof anchored to front and rear portions, respectively, of the mounting plate 18 as at 64 and 66 and the other pair of ends of the fluid cylinders 60 and 52 carry arcuate shoes 68 and 70 attached to a mounting band 72 journaled on that portion of the pin 22 disposed between the flanges 24 and 26. The cylinders 60 and 62 may be selectively operated to cause shifting of the mounting plate 18 between its limit positions with the portion 28 of the pin 22 seated in the opposite end portions 32 and 34 of the slot 30. It will be noted that a vertical plane containing the axis of rotation of the dual wheels 51 is disposed considerably rearward of the pin 22 when the mounting plate 18 is disposed in its rearmost limit position with the pin 22 seated in the forward end portion 34 of the slot 30 and that the axis of rotation of the wheels 51 is disposed forward of the pin 22 when the mounting plate 18 is displaced to its forward limit position with the portion 28 of the pin 22 seated in the rear end portion 32 of the slot 30.

When the mounting plate 18 is disposed in its rearmost position seated in the rear end portion 32 of the slot 30, the wheels 51 function as caster wheels when the trailer 10 is moving at speeds with a heavy load thereon. However, if it is desired to operate the trailer in reverse with the supplemental wheel assembly 16 still supporting a considerable portion of the load on the trailer 10, the cylinder 60 is actuated whereby the plate 18 will be shifted forwardly relative to the pin 22 toward a position with the portion 28 of the pin 22 seated in the rear end portion 32 of the slot 30. In this position, the wheels 51 will act as caster wheels when the trailer 10 is being operated in reverse.

Inasmuch as the fluid cylinders 60 and 62 enjoy a physical connection with the pin 22 and are carried by the plate 18, the cylinders are at all times ready to exert either a forward or rearward thrust on the pin 22 in order to shift the plate 18 in a path extending longitudinally of the slot 30 and relative to the pin 22.

Of course, when the trailer 10 is travelling at speed in a forward direction, the mounting plate 18 is rearwardly displaced to a position with the forward side of the pin 28 seated in the end portion 32 of the slot 30. However, when it is desired to operate the trailer in reverse, the mounting plate 18 is forwardly shifted so that the rear side of the pivot pin 22 will be seated in the end portion 32 of the slot 30. Further, as may be seen from FIG. 11 of the drawings, the cylinders 50 may be actuated to upwardly retract the rear ends of the trailing arms 40 relative to the trailer 10 and thereby elevate the wheels 48 above the ground. Also, it is to be noted that means other than the cylinders 50 may be utilized to upwardly retract the rear ends of the trailing arms 40. The air bags 46 may be provided with expansion springs normally upwardly biasing the rear ends of the trailing arms 16, but the air pressure within the bags 46 may be sufficient to overcome such upward spring pressure and in fact allow the wheels 51 to support a considerable portion of the load carried by the central portion of the trailer 10. In this manner, the cylinders 50 may be totally dispensed with.

Inasmuch as the assembly 16 is free to pivot in the direction in which the corresponding portion of the trailer is moving, the assemblage 16 may be constructed of lighter materials and need not include sway bars, torsion bars or stabilizer bars specifically designed to assist in maintaining proper location of the assemblage 16 beneath the trailer 10.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a semi-trailer of the type including a front portion for universal coupling to and support from a towing vehicle and a rear portion having wheeled running gear supported therefrom, supplemental wheeled running gear supported from an intermediate portion of said trailer disposed between said front and and rear portions, said supplemental wheeled running gear including a downwardly facing bearing plate stationarily mounted on said intermediate portion, a mounting plate supported from said bearing plate beneath the latter for free oscillation relative thereto about an upstanding axis and shifting of said mounting plate relative to said bearing plate along a predetermined path generally normal to said axis between first and second limit positions, said mounting plate having wheeled running gear supported therefrom including opposite side wheels journaled about horizontal axes extending substantially normal to said path, said axis being disposed on opposite sides of a vertical plane containing said axes when said mounting plate is in said first and second limit positions, and means operably connected between said mounting plate and said bearing plate operative to selectively shift said mounting plate between said first and second limit positions.

2. The combination of claim 1 including suspension means suspending said wheeled running gear from said mounting plate for vertical shifting relative thereto between upper and lower limit positions, said suspension means including means operative to yieldingly downwardly displace said wheeled running gear relative to said mounting plate.

3. The combination of claim 2 including means operable to selective upwardly retract said wheeled running gear relative to said mounting plate against the downward biasing action of said suspension means.

4. The combination of claim 2 wherein said suspension means includes a pair of opposite side trailing arms having front and rear ends and the front ends thereof pivotally mounted from said mounting plate for oscillation about a horizontal transverse axis, said wheeled running gear further including a transverse axle assembly mounting from and extending between the longitudinal midportions of said trailing arms, said means operative to yieldingly downwardly displace said running gear relative to said mounting plate comprising air bags mounted between the rear ends of said trailing arms and said mounting plate.

5. The combination of claim 4 including means operable to selective upwardly retract said wheeled running gear relative to said mounting plate against the downward biasing action of said suspension means.

6. In combination with a vehicle chassis including a front portion for universal coupling to a towing vehicle and a rear portion having wheeled running gear supported therefrom, a transverse supplemental axle assembly supported from said chassis intermediate said front and rear portions, said transverse axle assembly including opposite side wheels journaled therefrom for rotation about a horizontal transverse axis, a mounting plate, suspension means supporting said transverse axle assembly from said mounting plate for vertical shifting relative to said mounting plate, means downwardly biasing said transverse axle assembly relative to said mounting plate, and means mounting said mounting plate from said chassis for horizontal shifting along a path disposed at generally right angles relative to said axle assembly and oscillation of said mounting plate about an upstanding axis relative to said chassis and intersecting said path, said mounting plate being shiftable between limit positions with said upstanding axis placed to the rear and forward of an upstanding plane containing said axle assembly.

7. The combination of claim 6 including means operative to selectively upwardly retract said axle assembly relative to said chassis.

8. The combination of claim 6 wherein said suspension means includes a pair of opposite side trailing arms having front and rear ends with the front ends thereof pivotally mounted from said mounting plate for oscillation about a horizontal transverse axis, said transverse axle assembly being mounted from and extending between longitudinal mid-portions of said trailing arms, said means downwardly biasing said axle assembly relative to said mounting plate comprising air bags mounted between the rear ends of said trailing arm and said mounting plate.

9. The combination of claim 6 including reversable fluid motor means operatively connected between said chassis and said mounting plate for shifting said plate relative to said chassis along said path.

* * * * *